No. 818,882. PATENTED APR. 24, 1906.
J. W. GRAEME.
MOSQUITO NET.
APPLICATION FILED DEC. 12, 1905.
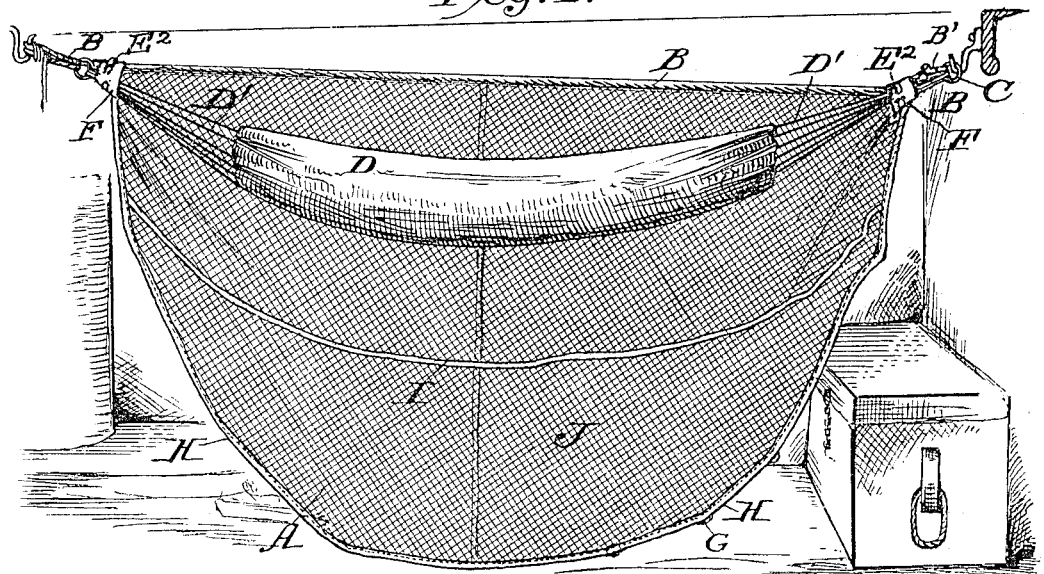
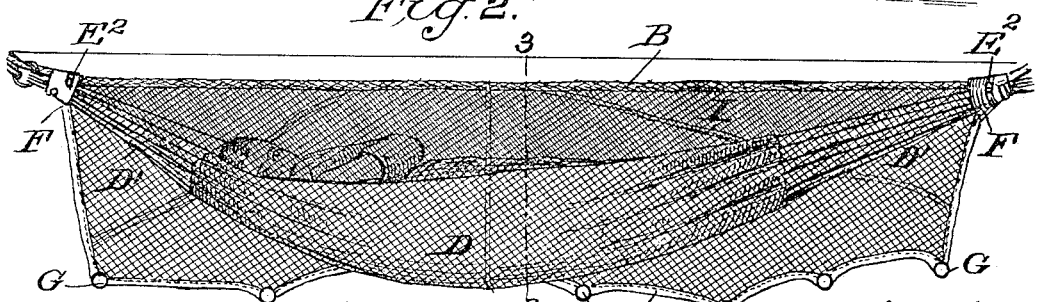
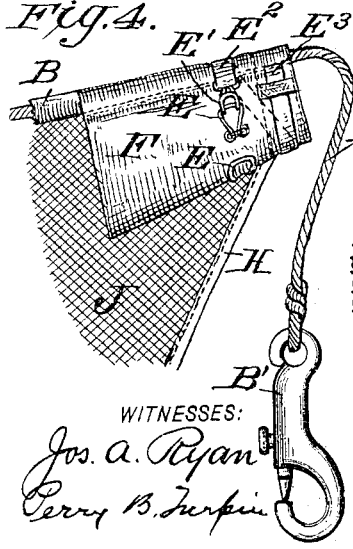
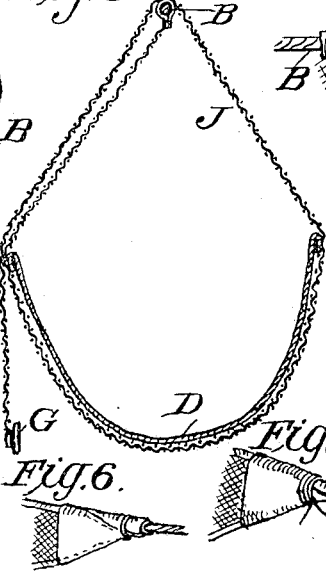
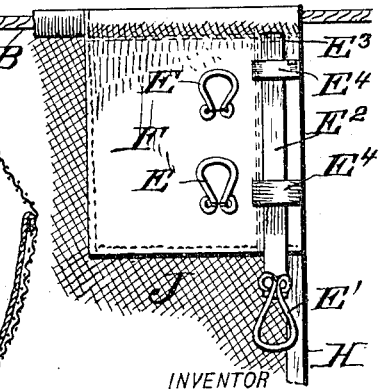
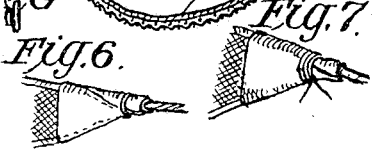
WITNESSES:
Jos. A. Ryan
Perry B. Turpin
INVENTOR
Joseph W. Graeme
BY
ATTORNEYS

UNITED STATES PATENT OFFICE.

JOSEPH WRIGHT GRAEME, OF THE UNITED STATES NAVY.

MOSQUITO-NET.

No. 818,882.      Specification of Letters Patent.      Patented April 24, 1906.

Application filed December 12, 1905. Serial No. 291,379.

*To all whom it may concern:*

Be it known that I, JOSEPH WRIGHT GRAEME, a citizen of the United States, and a lieutenant in the United States Navy, have invented certain new and useful Improvements in Mosquito-Nets, of which the following is a specification.

My invention is a mosquito-net intended especially for use on sailors' hammocks, though it may be used on any similar hammock; and the invention consists in certain novel constructions and combinations of parts, as will be hereinafter described and claimed.

In the drawings, Figure 1 is a side elevation of the mosquito-net applied to a hammock and open so the user may get into the hammock and dispose the net to keep off mosquitos, flies, &c. Fig. 2 is a side view of the net applied as in use. Fig. 3 is a cross-section on about line 3 3 of Fig. 2. Fig. 4 is an enlarged detail side view of one end of the net, showing the same fastened around one of the clews of the hammock. Fig. 5 is a side view showing the fastening device open, and Figs. 6 and 7 are detail views illustrating somewhat different means for securing the ends of the net around the hammock-clews.

The net A may be of any suitable material and size, according to the purpose for which it is designed, and is provided along one edge with a reinforcing-cord B, forming what may be termed a "backbone," extending from end to end along one edge of the net and adapted at one end, preferably by providing it with a snap-hook B', for connection with the hammock-ring C, one of which is shown in Fig. 1. The cord B extends beyond the ends of the net, as shown in Figs. 1 and 4, and at the ends of the net I provide suitable fastenings, whereby it may be secured around the clews D' of the hammock D. As shown, the fastenings include an eye or eyes E, arranged in series, and a hook E' to engage with the proper one of said eyes, the hooks and eyes being preferably secured to a small sheet F of canvas, cotton, linen, or other suitable material of sufficient strength to support the eyes and a strap E² being provided, to which the hook E' is secured. The strap E² is preferably secured at one end E³, passed through keepers E⁴, and supplied at its free end with the hook E'. I make this strap E² preferably of elastic webbing, so it may be drawn taut in securing the ends of the hammock-net closely around the clews.

In practice I prefer to provide a snap-hook B' at one end only of the cord B, such hook being snapped into the ring C at the head of the hammock. The other end of the cord is rove through the ring at the foot of the hammock or over the hook supporting the foot of the hammock, hauled taut, and hitched.

When applied as shown in Fig. 1 and secured to the hammock, the net is suspended on one side of the hammock, and the latter is unobstructed on one side, so the user may readily get into the hammock. When in the hammock, the net, which is of sufficient width to permit its application, as shown in Fig. 2, will be drawn up on the opposite side of the hammock and thrown over the backbone B, any suitable form of weights being provided at G along the free edge of the net to hold the same down when disposed as shown in Figs. 2 and 3. It will thus be noticed that I provide a net having a support above the hammock and depending from said support along one side of the hammock and extending thence beneath the hammock and up the opposite side and thence over the top support, entirely inclosing the hammock and its occupant.

The net may be secured at its ends around the clews in any suitable manner without departing from some of the broad principles of my invention. Thus an ordinary cord may be utilized for the purpose, simply tying the net at its ends around the clews, or an elastic band may be slipped over the ends of the cord B and utilized to fasten the ends of the net to the clews, or the strap of elastic or nonelastic material, with eye engaging with the hook or hooks, as shown, may be employed as a simple convenient means of holding the net tightly around the clews. I find it convenient, however, to employ the corner-pieces F at the ends of the net, as they strengthen it at such points and also form convenient supports for the fastening devices, as before described. I find it convenient to tape the net at H, I, and J to strengthen the same and prevent it from stretching out of shape.

The net will be especially valuable in tropical countries, particularly in ports infected with malaria and yellow fever. It can be conveniently applied for use and when not in use can be folded in compact form and lashed up in the hammock with the other bedding. It may be used for sportsmen's, hunters', or other forms of hammocks similar to the one shown.

Having thus described my invention, what I claim as new, and desire to secure by Letters Patent, is—

1. The hammock-net herein described, comprising the netting weighted along one edge and provided along its opposite edge with a reinforcing-cord adapted, when stretched, to form a backbone for supporting the net and having at the ends of the net adjacent to said reinforcing-cord, corner-pieces provided with eyes, and a strap having a hook to engage said eyes, the net being of sufficient width to be returned upon itself to form an inclosure around the hammock, substantially as and for the purposes set forth.

2. A hammock-net provided along one edge with a reinforcing-cord, and having at its ends, adjacent to said cord, fastening means adapted to secure the net around the clews of a hammock, substantially as set forth.

3. A mosquito-net provided along one edge with a reinforcing-cord, and having a snap-hook at one end of said cord, and provided adjacent to said cord, at the ends of the net, with fastening means adapted to encircle the clews of a hammock, substantially as set forth.

4. A net having a reinforce along one edge and provided at its ends adjacent to said reinforce with corner-pieces having eyes, and straps extending along said corner-pieces and adapted to encircle the clews of a hammock and provided with hooks for engagement with the eyes, substantially as set forth.

5. A hammock-net provided along one edge with a reinforce adapted to form a backbone, and at its ends adjacent to said reinforce with fastening means whereby it may be secured to the clews of a hammock, the net being of sufficient width to depend from said reinforce along one side of the hammock and be brought up the other side of the hammock and over the reinforce to inclose the hammock and its occupant, substantially as set forth.

6. A hammock-net provided along one edge with a reinforcing-cord adapted to form a backbone to support a returned portion of the net and extended beyond the ends of the net for connection with hammock-supporting devices substantially as set forth.

JOSEPH WRIGHT GRAEME.

Witnesses:
J. M. LUBY,
F. H. POTEET.